United States Patent Office 3,790,462
Patented Feb. 5, 1974

3,790,462
PROCESS FOR THE PREPARATION OF 1,1,1-TRIFLUORO-2-CHLORO-2-BROMOETHANE
Neithart Schultz, Eichsel, Hans-Joachim Vahlensieck, Wehr, and Peter Martens, Rheinfelden, Germany, assignors to Dynamit Nobel AG, Troisdorf, Germany
No Drawing. Filed Aug. 30, 1972, Ser. No. 284,825
Claims priority, application Germany, Sept. 3, 1971, P 21 44 160.1
Int. Cl. B01j 1/10
U.S. Cl. 204—163 R  8 Claims

ABSTRACT OF THE DISCLOSURE

A process for the preparation of 1,1,1-trifluoro-2-chloro-2-bromoethane in the gas phase at a temperature between 150 and 270° C. in the presence of a source of molecular chlorine under irradiation by light rays having a wave length between 2350 and 3800 angstroms.

BACKGROUND OF THE INVENTION

Field of the invention

This invention relates to a process for the preparation of 1,1,1-trifluoro-2-chloro-2-bromoethane, in which this halogenated hydrocarbon, also known as halothane, is produced in higher yields.

Discussion of the prior art

Halothane is widely used as a valuable inhalation anaesthetic. It can be prepared either by transposing 1,1,2-trifluoro-2-chloro-1-bromoethane to the desired end product by treatment with aluminum halides in accordance with West German Pat. 1,041,937. This method has a number of disadvantages, because on the one hand the starting product has to be manufactured by expensive intermediate processes, and on the other hand the transposition reaction is achieved incompletely, and it is then very difficult to separate the starting product from the end product by distillation since the difference in their boiling points is only 2 degrees.

In another process, according to West German Pat. 1,018,853, 1,1,1-trifluoro-2-chloro-2-bromoethane is prepared by the bromination of 1,1,1-trifluoro-2-chloroethane or by the chlorination of 1,1,1-trifluoro-2-bromoethane at temperatures between 300 and 600° C. However, it is difficult to perform these reactions technically because special apparatus is needed on account of the high temperatures in conjunction with the aggressive halogens. Furthermore, the yields are relatively low, especially in the chlorination of $CF_3$—$CH_2Br$ in a quartz reactor. Approximately 50% of the costly trifluorobromoethane input is lost in the form of by-products.

SUMMARY OF THE INVENTION

Broadly, this invention contemplates a process for preparing 1,1,1-trifluoro-2-bromoethane with a source of molecular chlorine gas in the gas phase at a temperature between 150 and 270° C. under irradiation by light rays having a wave length between 2350 and 3800 angstroms.

The present invention is based upon the finding that 1,1,1-trifluoro-2-chloro-2-bromoethane can be produced in significant quantities by chlorinating 1,1,1-trifluoro-2-bromoethane with a source of molecular chlorine gas in the gas phase at a temperature of 150 to 270° C., preferably 180 to 250° C. Generally speaking, the chlorine is present such that the mole ratio of 1,1,1-trifluoro-2-bromoethane to chlorine is between 1:1 and 10:1. Generally speaking, the actinic rays, such as ultraviolet rays are employed to irradiate the reactants. The use of these actinic rays provides the desired 1,1,1-trifluoro-2-chloro-2-bromoethane in significant quantities in a reaction characterized by an exceptionally high degree of reaction selectivity. Additionally, the use of actinic rays in the chlorination reaction permits use of temperatures substantially below those heretofore employed for chlorination of 1,1,1-trifluoro-2-bromoethane to prepare the desired end product.

The reaction is generally performed in a reactor whose liner is inert to the reactants employed. Suitably, means are employed to effect intermixture of the molecular chlorine and the organic compound to assure maximum contact between the two and the highest possible yield. Such include use of inert balls or other packing.

DESCRIPTION OF PREFERRED EMBODIMENTS

The present process is characterized by the fact that 1,1,1-trifluoro-2-bromoethane is caused to react with chlorine in a molar ratio of 1,1,1-trifluoro-2-bromoethane to chlorine between 1:1 and 10:1, preferably between 2:1 and 5:1, in the gaseous phase at 150° C. to 270° C., preferably between 180° C. and 250° C., under irradiation with actinic rays. In this procedure the disadvantages of the processes known hitherto are not encountered, and it has surprisingly been found that the chlorination of $CF_3$—$CH_2Br$ performed in this manner produces very good yields and is easy to perform technically. Contrary to expectations, the ultraviolet chlorination of 1,1,1-trifluoro-2-bromoethane does not result in a polychlorination, but greatly favors the monochlorinated compound $CF_3$—$CHClBr$. The relatively low temperature has a greatly desired gentle effect on the starting and end compounds, so that the percentage of by-products, such as those which develop in the prior art high-temperature chlorination in the quartz reactor as a result of thermal cleavage, e.g., polychlorinated products and secondary reaction products are kept extremely low.

The process of the invention is preferably performed in a glass reactor. However, other reactor materials which do not react with the reagents are also suitable.

The time of stay and the molar ratio of the reaction components within the reactor can be varied to a great extent. However, it must be realized that if more than stoichiometric amounts of chlorine are used, an increasing amount of undesired more highly chlorinated products will form, or a part of the chlorine will not react and accordingly will have to be removed or processed, so that it is desirable to use an excess of trifluorobromomethane. Between 2 and 10 moles of $CF_3$—$CH_2Br$ per mole of $Cl_2$ has proven to be an especially desirable ratio. Molar ratios greater than 10:1 are unsuitable due to excessively low transformations.

The gaseous phase chlorination of the invention is performed especially well in the temperature range between 150° C. and 270° C. Since the reaction takes place without change in volume it is independent of pressure. It is easiest, therefore, to operate at normal pressure, but elevated or reduced pressure may also be applied. Generally, the pressure may be as low as 0.5 atmosphere or as high as 2 atmospheres, preferably between 0.8 and 1.2 atmospheres.

For the performance of the reaction it is desirable to pass the gaseous mixture of 1,1,1-trifluoro-2-bromoethane and chlorine in the desired quantity ratio through a short premixing zone ahead of the reactor and then through the reactor heated to the desired temperature. The reactor consists of a glass reactor preferably one-half to two-thirds filled with glass packing and of suitable dimensions, having a water-cooled ultraviolet light source mounted on its input end. The ultraviolet light source should emit light rays having a wave length between 2350 and 3800 angstroms, preferably at about 2540 and/or 3660 angstroms.

The radiation source is preferably an ultraviolet lamp, but other radiation source can be used which produces short-wave radiations within the wave lengths set forth above, such as an electric arc, for example. The radiation source can also be disposed along the length of the said reaction chamber.

The chlorine should be in contact with the organic reactant in the presence of the emitted rays for at least 10 seconds, preferably between 20 and 50 seconds. Higher times are undesirable as polychlorination may result.

Instead of glass packing, other packing may be used which does not react with the compounds participating in the reaction, such as clay or pumice rings or balls, for example.

The reactions product, after passing through the reactor and cooling to room temperature, are washed, together with unreacted starting compounds, with aqueous caustic soda solution, and the organic phase is separated, dried and fractionally distilled. The 1,1,1-trifluoro-2-chloro-2-bromoethane obtained is identified by the infrared spectrum, the gas chromatogram, and its physical constants such as boiling point, specific gravity, and index of refraction.

A small amount of organic compounds remains dissolved in the aqueous phase and can be recovered therefrom by distillation.

The following examples are intended to explain the process without limiting the scope of the invention.

EXAMPLE 1

A gaseous mixture of 1 mole of 1,1,1-trifluoro-2-bromoethane and 0.5 mole/h. of chlorine is passed for a period of 50 hours through a vertically disposed glass reactor with an inside diameter of 30 mm. and a heated length of 800 mm., at whose input end a water-cooled 150-watt ultraviolet lamp made by "quarzlampen G.m.b.h." of Hanau, Germany, is located, and which is 70% filled with glass Raschig rings (approximately 8 x 8 mm.). The lamp emits rays of wave length between 2350 and 3800 angstroms. The temperature in the reaction chamber is kept between 190° C. and 210° C. throughout the reaction. The reaction products, after cooling to room temperature, are passed into a 12% aqueous caustic soda solution whose quantity is sufficient to maintain a pH above 7 in the aqueous phase for the duration of the experiment. A two-phase mixture forms. The lower, organic phase is separated upon termination of the process. An additional small amount of organic substance is obtained by distillation from the aqueous phase and combined with the principal amount first separated. After brief drying over sodium sulfate the following was obtained by fractional distillation:

|  | G. |
|---|---|
| $CF_3CH_2Br$ | 6505 |
| $CF_3CHClBr$ | 1480 |
| $CF_3—CCl_2Br$ | 370 |
| $CF_3—CHBr_2$ | 120 |
| $CF_3—CCl_3$ | 25 |
| By-products | 30 |

For a total input of 8150 g. 1,1,1-trifluoro-2-bromoethane, the yield of 1,1,1-trifluoro-2-chloro-2-bromoethane amounts to 74.1% of the consumed quantity of trifluorobromoethane. The boiling point at 735 torr of the 1,1,1-trifluoro-2-bromoethane was 48.9° C. and its index of refraction was 1.3700 (20° C.).

EXAMPLE 2

A mixture of 5.15 moles/h. of $CF_3—CH_2Br$ and 1.03 moles/h. of chlorine is fed into the top of a vertically disposed glass reactor 800 mm. long with an inside diameter of 65 mm., filled to 65% with glass packing, with a water-cooled ultraviolet source mounted at its input end. The wave length of the rays were between 2350 and 3800 angstroms.

In an experiment over a period of 14 hours a total of 11,760 g. of trifluorobromoethane was put in. The temperature in the reactor amounted to from 200 to 220° C.

After the process had been terminated and the products had been processed as in Example 1, 1710 g. of 1,1,1-trifluoro-2-chloro-2-bromoethane was obtained in addition to 9940 g. of unconsumed trifluorobromoethane, plus a total of 512 g. of by-products, which corresponds to a yield of $CF_3$—CHClBr amounting to 77.6% of the reacted trifluorobromoethane and indicates a highly selective reaction.

Characteristics of the 1,1,1-trifluoro-2-chloro-2-bromoethane: BP at 735 torr: 48.9° C.; $n_D^{20}$=1.3700.

EXAMPLE 3

In an experimental arrangement in accordance with Example 2, a total of 9600 g. of trifluorobromoethane was reacted at a temperature of 220° C. to 240° C. with chlorine for 8 hours, in a molar ratio $CF_3—CH_2Br:Cl_2$ of 3:1. After appropriate processing, 7795 g. of $CF_3—CH_2Br$, 1555 g. of $CF_3CHClBr$ and a total of 660 g. of by-products are obtained. The yield of $CF_3$—CHClBr amounts to 71.1%.

EXAMPLE 4

With an input of 1200 g. of $CF_3—CH_2Br$ per hour, in an apparatus similar to Example 2, reaction with chlorine in a 3:1 molar ratio, at a reaction temperature of 185° C. to 200° C., for a period of 12 hours, yielded a total of 13,090 g. of $CF_3—CH_2Br$, 1315 g. $CF_3$—CHClBr and 255 g. of by-products.

The yield of 1,1,1-trifluoro - 2 - chloro-2-bromoethane amounts to 82.9%.

Characteristics of the 1,1,1-trifluoro-2-chloro-2-bromoethane: B.P. at 735 torr=48.9° C.; $n_D^{20}$=1.3700.

What is claimed is:
1. The process for the preparation of 1,1,1-trifluoro-2-chloro-bromoethane which comprises contacting, in the gas phase, 1,1,1-trifluoro-2-bromoethane with a source of molecular chlorine at a temperature of 150 to 270° C. under conditions of irradiation of light at a wave length between 2350 and 3800 angstroms.

2. The process according to claim 1 wherein the reaction is conducted at a temperature between 180 and 250° C.

3. The process according to claim 2 wherein the molar ratio of 1,1,1-trifluoro-2-bromoethane to chlorine is between 1:1 and 10:1.

4. The process according to claim 3 wherein said ratio is between 2:1 and 5:1.

5. The process according to claim 4 wherein the reaction is performed in a glass reactor.

6. The process according to claim 5 wherein the reactants are in contact with one another under said irradiation for a period of time between 20 and 50 seconds.

7. The process according to claim 7 wherein the reactor is between one-half and two-thirds filled with glass packing.

8. The process according to claim 9 carried out at a pressure between 0.5 and atmospheres.

References Cited

UNITED STATES PATENTS 2,499,629  3/1950  Calfee _____ 204—163 R

FOREIGN PATENTS 1,018,853  11/1957  Germany.

BENJAMIN R. PADGETT, Primary Examiner

UNITED STATES PATENT OFFICE
CERTIFICATE OF CORRECTION

Patent No. 3,790,462  Dated February 5, 1974

Inventor(s) Neithart Schultz, Hans-Joachim Vahlensieck & Peter Marter

It is certified that error appears in the above-identified patent and that said Letters Patent are hereby corrected as shown below:

Column 4, line 60 (claim 7)

"7" should be "6".

Column 4, line 63 (claim 8)

"9" should be "1".

Column 4, line 64

After "and" and before "atmospheres" insert -- 2 --.

Signed and sealed this 5th day of November 1974.

(SEAL)
Attest:

McCOY M. GIBSON JR.
Attesting Officer

C. MARSHALL DANN
Commissioner of Patents